US008073930B2

(12) United States Patent
Yee

(10) Patent No.: US 8,073,930 B2
(45) Date of Patent: Dec. 6, 2011

(54) SCREEN READER REMOTE ACCESS SYSTEM

(75) Inventor: David Yee, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 969 days.

(21) Appl. No.: 10/173,215

(22) Filed: Jun. 14, 2002

(65) Prior Publication Data

US 2009/0100150 A1 Apr. 16, 2009

(51) Int. Cl.
*G06F 15/16* (2006.01)

(52) U.S. Cl. ........................................ 709/219; 709/246

(58) Field of Classification Search .................. 370/351; 704/1–3, 8–9, 260, 271, 270.1; 715/513; 709/227–229, 219, 246; 375/227–229, 354, 375/356

See application file for complete search history.

(56) References Cited

U.S. PATENT DOCUMENTS

| | | | | |
|---|---|---|---|---|
| 5,864,814 | A * | 1/1999 | Yamazaki | 704/270.1 |
| 6,081,780 | A * | 6/2000 | Lumelsky | 704/260 |
| 6,442,523 | B1 * | 8/2002 | Siegel | 704/270 |
| 6,453,294 | B1 * | 9/2002 | Dutta et al. | 704/270.1 |
| 6,557,026 | B1 * | 4/2003 | Stephens, Jr. | 709/203 |
| 6,604,077 | B2 * | 8/2003 | Dragosh et al. | 704/270.1 |
| 6,718,015 | B1 * | 4/2004 | Berstis | 379/88.17 |
| 6,738,951 | B1 * | 5/2004 | Weiss et al. | 715/523 |
| 6,889,337 | B1 * | 5/2005 | Yee | 714/1 |
| 6,922,726 | B2 * | 7/2005 | Basson et al. | 709/227 |
| 7,035,794 | B2 * | 4/2006 | Sirivara | 704/219 |
| 7,219,136 | B1 * | 5/2007 | Danner et al. | 709/219 |
| 2002/0103646 | A1 * | 8/2002 | Kochanski et al. | 704/260 |
| 2003/0028378 | A1 * | 2/2003 | August et al. | 704/260 |
| 2003/0061048 | A1 * | 3/2003 | Wu et al. | 704/260 |
| 2003/0139980 | A1 * | 7/2003 | Hamilton | 705/27 |
| 2003/0208356 | A1 * | 11/2003 | King et al. | 704/270 |

OTHER PUBLICATIONS

Macias et al., Improving Web accessibility for visually handicapped people using KAI, 3rd International Workshop on Web Site Evolution 2001, Nov. 2001, pp. 1-6.*

Freedom Scientific, Blind Low Vision Group, Connect Outloud Quick Reference Guide, Freedom Scientific, Jan. 2001, pp. 1-12.*

* cited by examiner

*Primary Examiner* — Glenton B Burgess
*Assistant Examiner* — Oleg Survillo
(74) *Attorney, Agent, or Firm* — Kilpatrick Townsend & Stockton LLP

(57) ABSTRACT

The present invention provides an assistive technology screen reader in a distributed network computer system. The screen reader, on a server computer system, receives display information output from one or more applications. The screen reader converts the text and symbolic content of the display information into a performant format for transmission across a network. The screen reader, on a client computer system, receives the performant format. The received performant format is converted to a device type file, by the screen reader. The screen reader then presents the device type file to a device driver, for output to a speaker, braille reader, or the like.

12 Claims, 7 Drawing Sheets

SCREEN READER REMOTE ACCESS SYSTEM

FIELD OF THE INVENTION

The present invention relates to user interfaces, and more particularly to a remote accessible screen reading system.

BACKGROUND OF THE INVENTION

Disabled users need assistive technology such as screen readers to navigate user interfaces of computer programs. Currently, the prior art method requires a screen reader to be installed on each user's machine. However, that does not align well with today's server centralized approach to software, where thin client machines, with little software installed, talk to large servers.

Currently, if one were to configure a client machine to remotely access a server using remote operation software such as VNC or pcAnywhere, and if the screen reader were installed on the server, the spoken output would happen on the server, rather than on the client machine. The result is that the disabled user does not hear any of the spoken output at the client machine.

One solution would be for the client machine to dial in to a server via VNC, pcAnywhere, or the like, and for the user to call on a telephone and place the telephone microphone near the server's speaker. This method is impractical in that it is laborious and serves only one user.

Furthermore, having screen reading software installed at all client machines is costly and difficult to maintain. It is costly because every client needs to buy a copy of the screen reader software. Difficult to maintain stems from the fact that all clients would need to upgrade simultaneously, at each and every location, and each user machine may have configuration specific variations.

Thus there is a need for screen reading software for use in a distributed network computer system. Furthermore, there is a need for a performant format for transmitting data over the network.

SUMMARY OF THE INVENTION

In one embodiment of the present invention, a screen reader, on a server computer system, receives display information output from one or more applications. The screen reader converts the text and symbolic content of the display information into a performant format for transmission across a network. The screen reader, on a client computer system, receives the performant format. The received performant format is converted to a device type file, by the screen reader. The screen reader then presents the device type file to a device driver, for output to a speaker, braille reader, or the like.

The present invention provides a terse representation of text and symbolic content for transmission over a network. The present invention can handle multiple users in a distributed network computer system. The present invention also provides the ability to centralize management of screen reading technology.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 1:
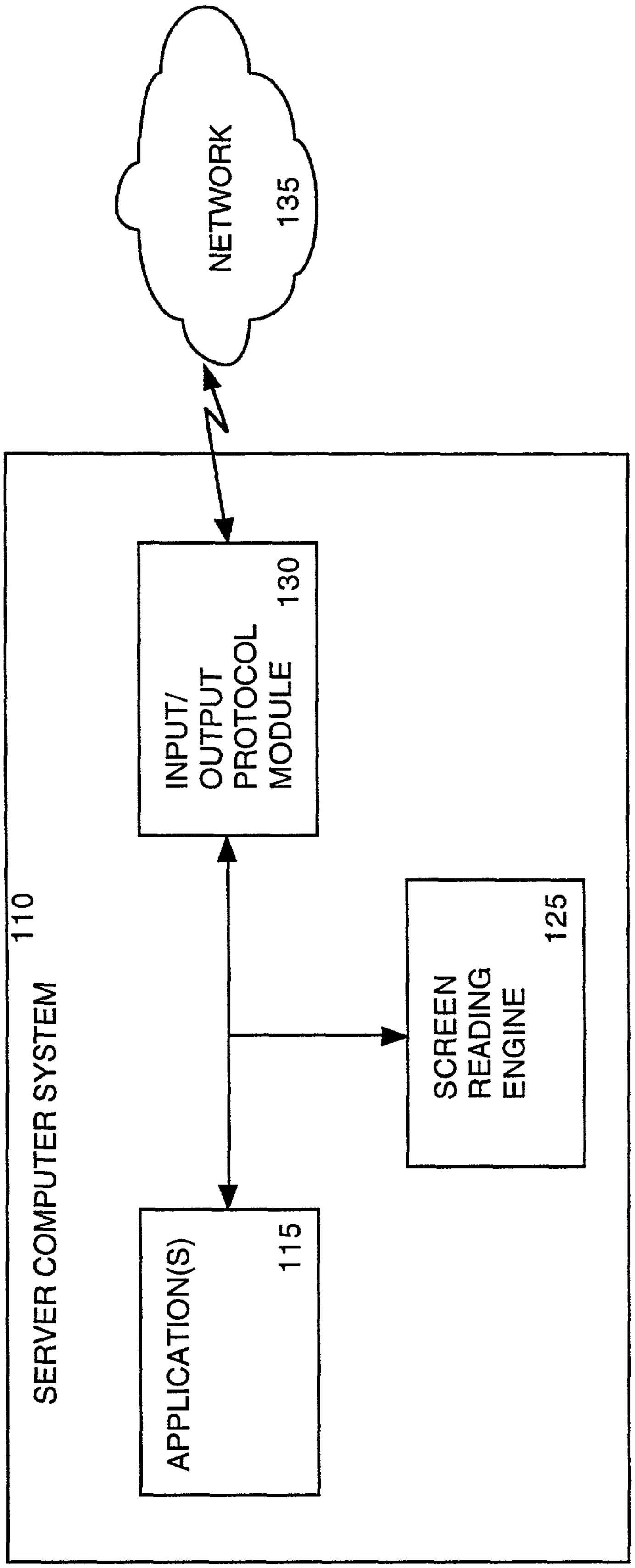
FIG. 1 shows a block diagram of software-based functionality components of a server computer system providing assistive technology in accordance with one embodiment of the present invention.

With reference now to FIG. 1, a block diagram of software-based functionality components of a server computer system 110 providing assistive technology in accordance with one embodiment of the present invention is shown. As depicted in FIG. 1, the software-based functionality components include one or more applications (e.g. word processor, database, browser, and the like) 115 communicatively coupled to an input/output protocol module 130. A screen reading engine 125 is also communicatively coupled to the applications 115 and the input/output protocol module 130. The input/output protocol module 130 provides for transmission and reception across a communication channel, network, local area network, wide area network, internet, or the like (herein after referred to as a network) 135.

Those skilled in the art will appreciate that the application 115 also exchanges input and output data, representing keyboard entries, pointing device movements, monitor display information, and the like, with a client computer system via the input/output protocol module 130. The exchange may be done utilizing any well-known method such as Citrix, VNC, Tarantella, pcAnywhere, or the like.

The application 115 provides information, for output on a display device. The screen reading engine 125 parses such information to detect the text, symbolics, and the like, to be displayed. The text and symbolics are then transmitted in a performant format. The performant format is selected based upon the desired bit rate for transmission across the network 135 and/or intelligibility of the computer-synthesized speech.

The performant format may be: a representation of the text and symbolics content; a representation of phonemes, diphones, half syllables, syllables, words, combinations thereof (e.g. word stem and inflection ending) or the like, corresponding to the text and symbolics content; a representation of audio device files, braille device files, or the like, corresponding to the text and symbolics content. Representation is intended to mean: a coded version (e.g. ASCII) or the like; digital signal, analog signal, or the like; electrical carrier, optical carrier, electromagnetic carrier, or the like; modulated (e.g. accent), un-modulated, or the like; compressed (e.g. compression algorithm), un-compressed, or the like; and any combination thereof.

For example, a phoneme is generally the smallest pieces of speech. Depending upon the language used, there are about 35-50 phonemes in a language. The advantage of converting text, symbolics, and the like to phonemes as opposed to words is that there are fewer phonemes than words, and thus less memory and transmission capacity is required. However, the quality of the transition between phonemes directly relates to the intelligibility of the computer-synthesized speech. To achieve more intelligible computer-synthesized speech, the cut may be done at the center of the phonemes instead of splitting of the transition. Thus leaving the transitions themselves intact. Such a method is know as diphones. There are about 400 diphones in a language, which requires greater transmission bandwidth but provides more intelligible speech.

In an optional feature of the present embodiment, the symbolics (i.e. image, applet, area tag, or the like) content is converted to text by use of the symbolics metadata, such as file name, file description, HTML alt attribute, HTML long description, or the like. In such an implementation, the performant format only includes representations of composite text, which is derived from the original text and symbolics.

Figure 2:
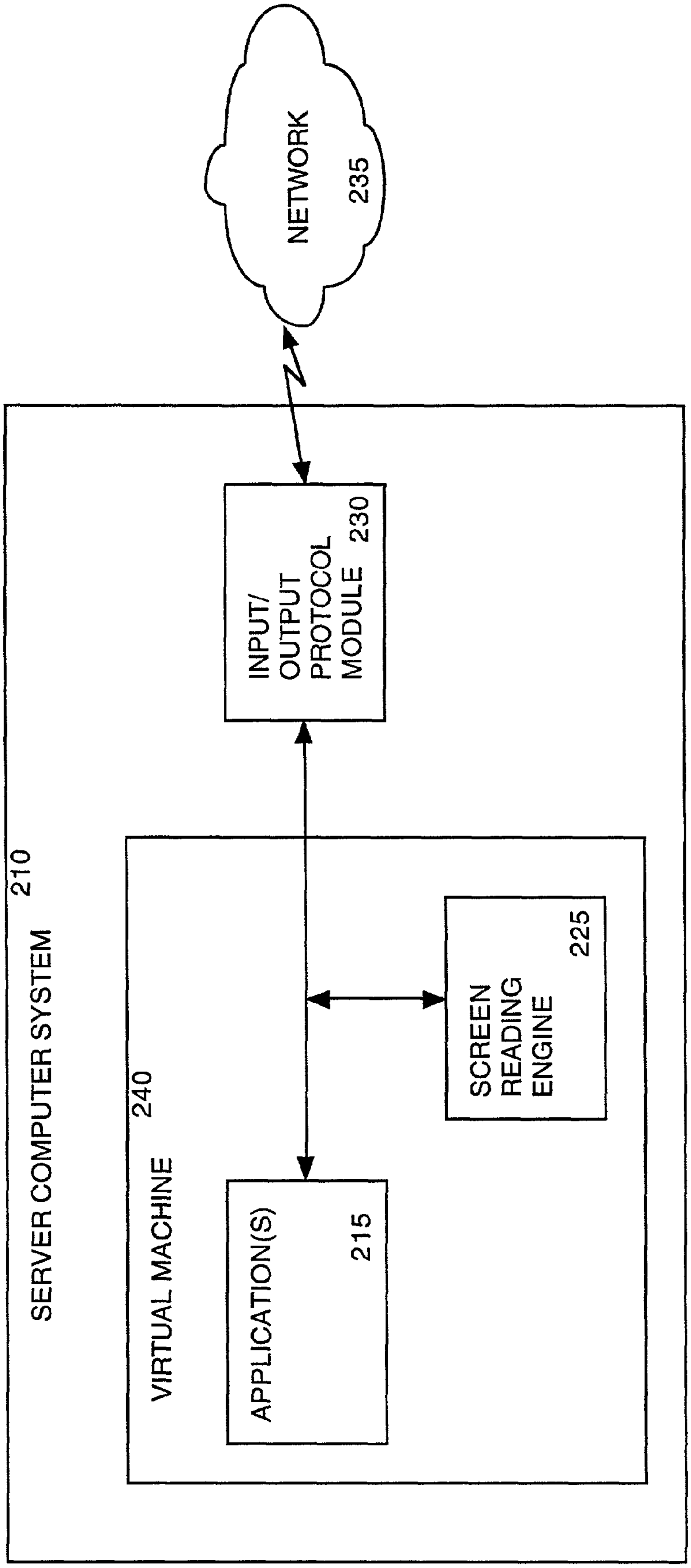
FIG. 2 shows a block diagram of software-based functionality components of a server computer system providing assistive technology in accordance with another embodiment of the present invention.

With reference now to FIG. 2, a block diagram of software-based functionality components of a server computer system 210 providing assistive technology in accordance with another embodiment of the present invention is shown. As depicted in FIG. 2, the software-based functionality components include one or more applications (e.g. word processor, database, browser, and the like) 215 communicatively coupled to an input/output protocol module 230. A screen reading engine 225 is also communicatively coupled the applications 215 and the input/output protocol module 230. The input/output protocol module 230 provides for transmission and reception across a network 235.

The applications 215, and screen reading engine 225 operate as a self-contained operating environment, in a virtual machine 240. The server computer system 215 is capable of supporting multiple self-contained operating environments. Thus the present embodiment provides isolation between multiple client computer systems running against the server computer system 210.

The application 215 provides information, for output on a display device. The screen reading engine 225 parses such information to detect the text and symbolics to be displayed. The text and symbolics are then transmitted in a performant format. The performant format is selected based upon the desired bit rate for transmission across the network 235 and/or intelligibility of the computer-synthesized speech.

The performant format may be: a representation of the text and symbolics content; a representation of phonemes, diphones, half syllables, syllables, words, combinations thereof (e.g. word stem and inflection ending) or the like, corresponding to the text and symbolics content; a representation of audio device files, braille device files, or the like, corresponding to the text and symbolics content. Representation is intended to mean: a coded version (e.g. ASCII) or the like; digital signal, analog signal, or the like; electrical carrier, optical carrier, electromagnetic carrier, or the like; modulated (e.g. accent), un-modulated, or the like; compressed (e.g. compression algorithm), un-compressed, or the like; and any combination thereof.

For example, a phoneme is generally the smallest pieces of speech. Depending upon the language used, there are about 35-50 phonemes in a language. The advantage of converting text, symbolics, and the like to phonemes as opposed to words is that there are fewer phonemes than words, and thus less memory and transmission capacity is required. However, the quality of the transition between phonemes directly relates to the intelligibility of the computer-synthesized speech. To achieve more intelligible computer-synthesized speech; the cut may be done at the center of the phonemes, instead of splitting of the transition. Thus leaving the transitions themselves intact. Such a method is know as diphones. There are about 400 diphones in a language, which requires greater transmission bandwidth but provides more intelligible speech.

In an optional feature of the present embodiment, the symbolics (i.e. image, applet, area tag, or the like) content is converted to text by use of the symbolics metadata, such as file name, file description, HTML alt attribute, HTML long description, or the like. In such an implementation, the performant format only includes representations of composite text, which is derived from the original text and symbolics.

Figure 3:
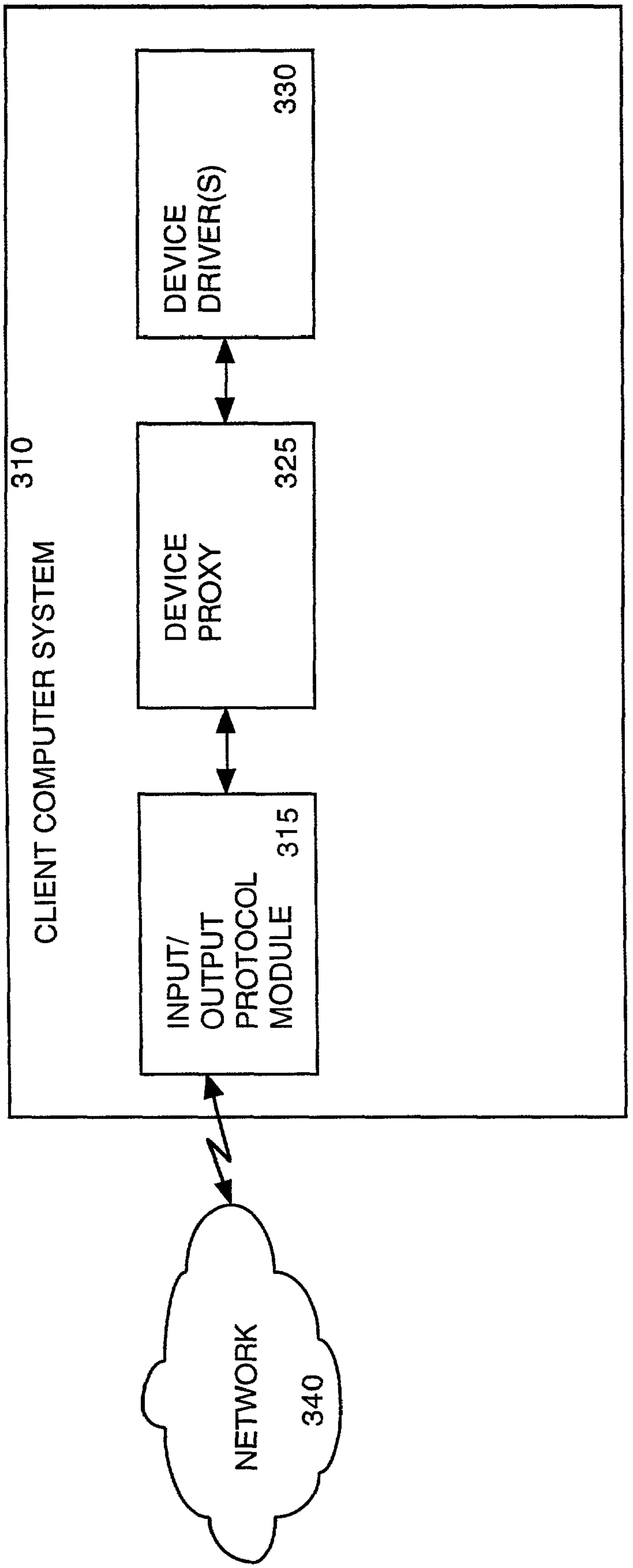
FIG. 3 shows a block diagram of software-based functionality components of a client computer system 310 in accordance with one embodiment of the present invention.

With reference now to FIG. 3, block diagram of software-based functionality components of a client computer system 310 in accordance with one embodiment of the present invention is shown. As depicted in FIG. 3, the software-based functionality components include an input/output protocol module 315 communicatively coupled a device proxy 325. The device proxy 325 is also communicatively coupled to one or more drivers 330, such as a display device driver, alphanumeric device driver, pointing device driver, braille device driver, and/or audio device driver.

The input/output protocol module 315 receives performant formatted representations of text and symbolics, from a network 340. The received performant formatted representations of text and symbolics are converted to an output file, by the device proxy 325, for presentation to one or more device drivers 330, such as an audio device driver and/or braille device driver. The device proxy acts as a go-between, receiving performant formatted information from a screen reading engine running on a server, and translating and forwarding it on to the device driver.

Figure 4:
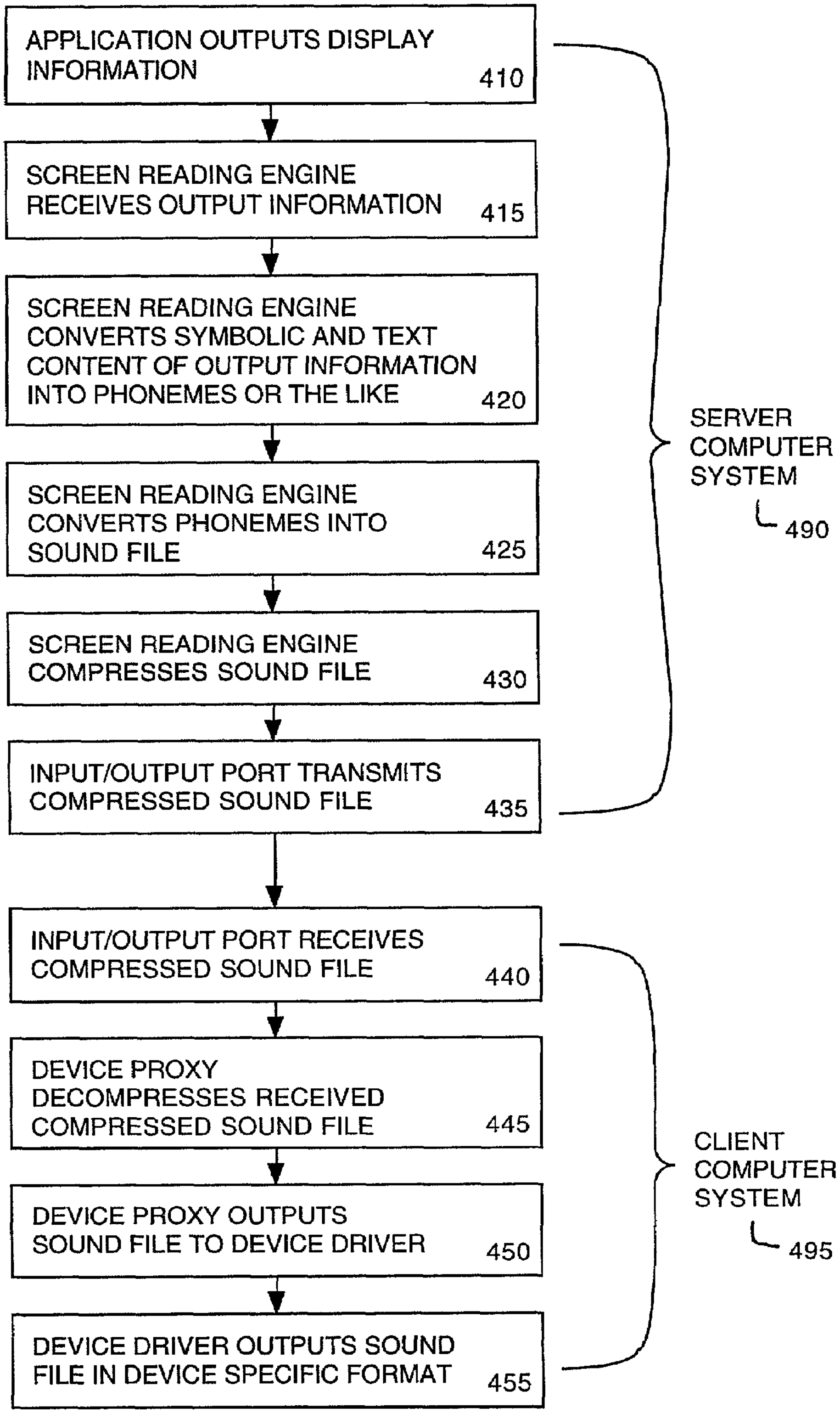
FIG. 4 shows a flow diagram of a screen reading process in accordance with one embodiment of the present invention.

With reference now to FIG. 4, a flow diagram of a screen reading process in accordance with one embodiment of the present invention is shown. As depicted in FIG. 4, the process begins with an application (e.g. word processor, database, browser, or the like), executing on a server computer system 490, outputting display information (i.e. text, symbolics, and/or the like), at step 410.

The output information is received by a screen reading engine, at step 415. The symbolics (i.e. image or the like) are converted by the screen reading engine to words (i.e. text), by use of the symbolics metadata, such as file name, file description, HTML alt attribute, HTML long description or the like. The screen reading engine also breaks the output information into phonemes, diphones, half syllables, syllables, words, or the like, or combinations thereof (e.g. word stem and inflection endings), at step 420.

For example, a phoneme is generally the smallest pieces of speech. Depending upon the language used, there are about 35-50 phonemes in a language. The advantage of converting text, symbolics, and the like to phonemes as opposed to words is that there are fewer phonemes than words, and thus less memory and transmission capacity is required. However, the quality of the transition between phonemes directly relates to the intelligibility of the computer-synthesized speech. To achieve more intelligible computer-synthesized speech; the cut may be done at the center of the phonemes, instead of splitting of the transition. Thus leaving the transitions themselves intact. Such a method is know as diphones. There are about 400 diphones in a language. Furthermore, as those skilled in the art will appreciate there are more half syllables than diphones, more syllable than half syllables, and more words than syllables. Thus, the choice of converting information to phonemes, diphones, half syllable, syllables, or the like will be dependent upon the desired bit rate to be transmitted across a network.

The screen reading engine then converts the phonemes, diphones, half syllables, syllables, words, combinations thereof, or the like, into a audio file (e.g. a wave file), at step 425. The audio file is then compressed by the screen reading engine into a file such as a streaming audio file or the like, at step 430, and transmitted by an input/output port of the server computer system, at step 435, across the network.

In an alternative feature of the present embodiment, the audio file may be modulated based upon characteristics such as rate of speech, accent and the like.

The compressed audio file is received at the input/output port, at step 440, of a client computer system 495. A device proxy decompresses the received compressed sound file, at step 445. The device proxy then outputs the decompressed audio file to a device driver, at step 450. The display driver then outputs the audio file in a device specific format appropriate for driving an output device (e.g. speaker or the like), at step 455.

In another alternative feature of the present embodiment, the server computer system 490 provides a virtual machine operating environment. Thus, the server computer system 490 provides isolation between multiple client computer systems 495 running against the server computer system 490.

Figure 5:
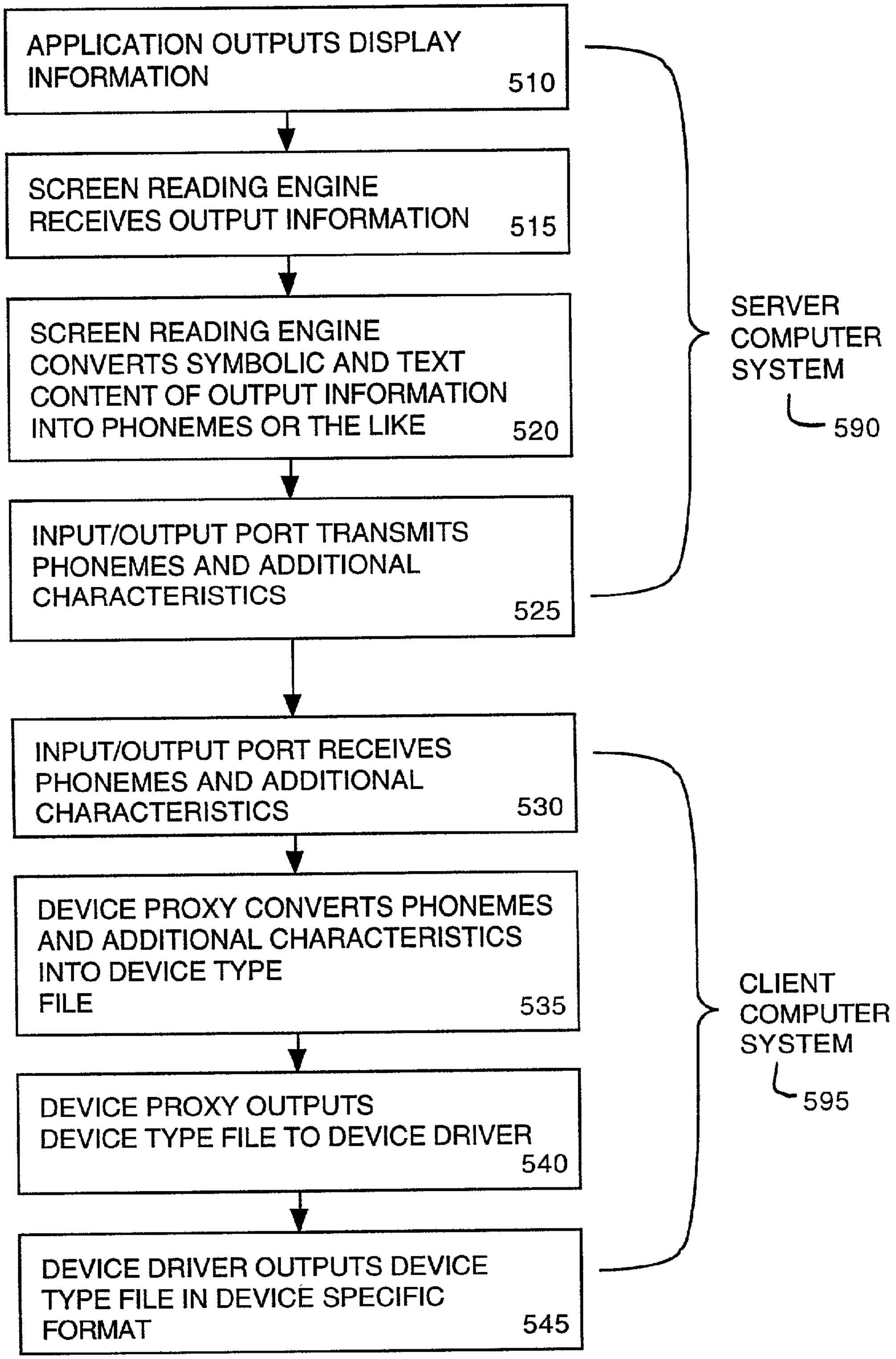
FIG. 5 shows a flow diagram of a screen reading process in accordance with another embodiment of the present invention.

With reference now to FIG. 5, a flow diagram of a screen reading process in accordance with another embodiment of the present invention is shown. As depicted in FIG. 5, the process begins with an application (e.g. word processor, database, browser, or the like), executing on a server computer system 590, outputting display information (i.e. text, symbolics, and/or the like), at step 510.

The outputted display information is received by a screen reading engine, at step 515. The symbolics (i.e. image or the like) are converted by the screen reading engine to words (i.e. text), by use of the symbolics metadata, such as file name, file description, HTML alt attribute, HTML long description, or the like. The screen reading engine also breaks the output information into phonemes, diphones, half syllables, syllables, words, or the like, or combinations thereof (e.g. word stem and inflection endings), at step 520.

For example, a phoneme is generally the smallest pieces of speech. Depending upon the language used, there are about 35-50 phonemes in a language. The advantage of converting text, symbolics, and the like to phonemes as opposed to words is that there are fewer phonemes than words, and thus less memory and transmission capacity is required. However, the quality of the transition between phonemes directly relates to the intelligibility of the computer-synthesized speech. To achieve more intelligible computer-synthesized speech; the cut may be done at the center of the phonemes, instead of splitting of the transition. Thus leaving the transitions themselves intact. Such a method is know as diphones. There are about 400 diphones in a language. Furthermore, as those skilled in the art will appreciate there are more half syllables than diphones, more syllable than half syllables, and more words than syllables. Thus, the choice of converting display information to phonemes, diphones, half syllable, syllables, or the like will be dependent upon the desired bit rate to be transmitted across a network.

The phonemes, diphones, half syllables, syllables, words, combinations thereof, or the like, are then transmitted by an input/output port, at step 525, across a network.

The transmitted phonemes, diphones, half syllables, syllables, words, combinations thereof, or the like are received by an input/output port of a client computer system, at step 530. The device proxy converts the phonemes, diphones, half syllables, syllables, words, combinations thereof, or the like, into a device type file (audio device file, braille device file, or the like), at step 535. The device proxy then outputs the device type file to a device driver, at step 540. The device driver converts the device type file into a device specific format, at step 545. The device specific format is used to activate an output device such as a speaker, braille reader, or the like.

In an alternative feature of the present embodiment, the screen reading engine also generates additional characteristics such as rate of speech, accent, and the like. The additional characteristics are transmitted from the input/output port on the server computer system, at step 525 to the input/output port on the client computer system, at step 530. The device proxy uses the additional characteristics to modulate the sound file.

In another alternative feature of the present embodiment, the server computer system 590 provides a virtual machine operating environment. Thus, the server computer system 590 provides isolation between multiple client computer systems 595 running against the server computer system 590.

Figure 6:
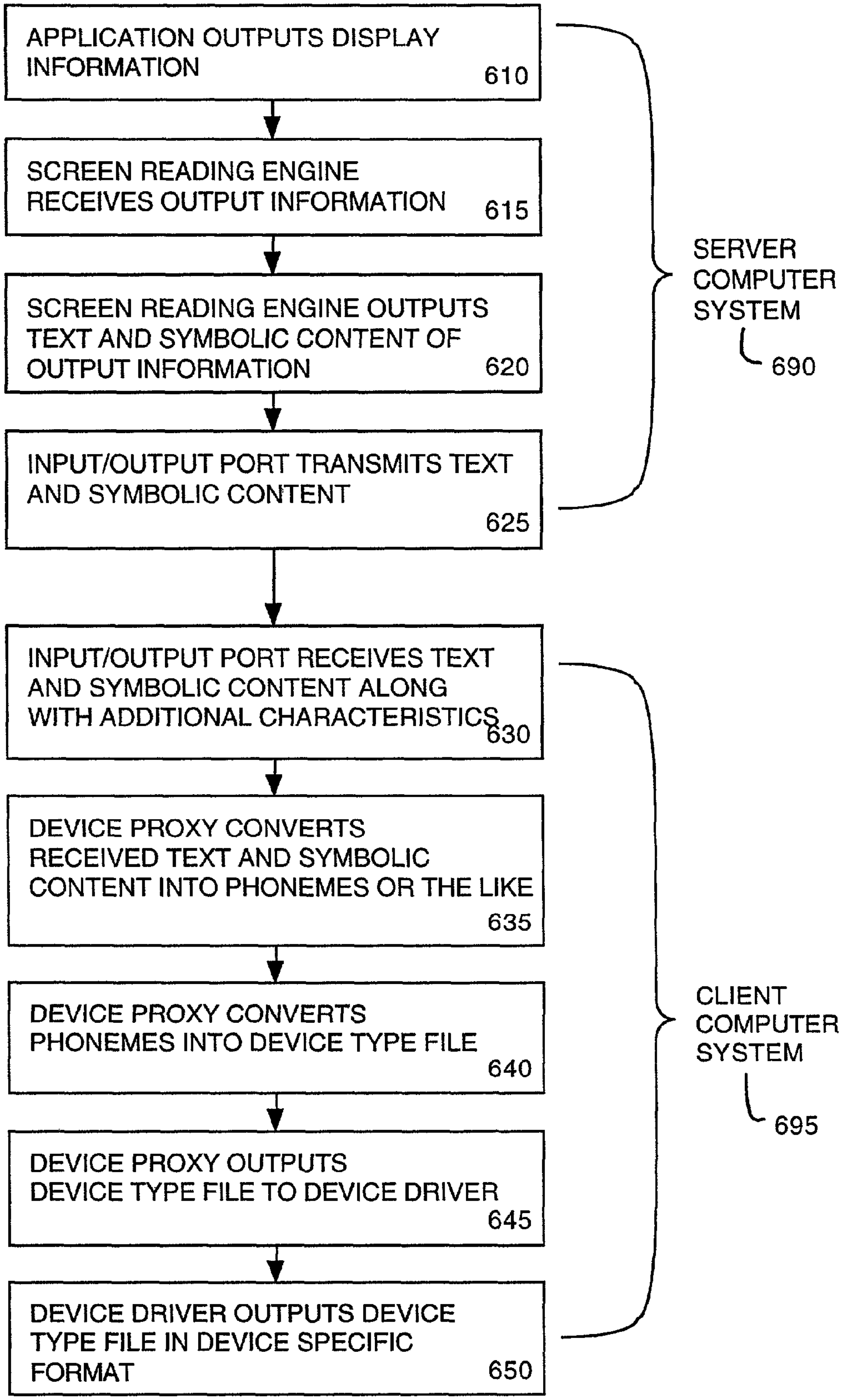
FIG. 6 shows a flow diagram of a screen reading process in accordance with yet another embodiment of the present invention.

With reference now to FIG. 6, a flow diagram of a screen reading process in accordance with yet another embodiment of the present invention is shown. As depicted in FIG. 6, the process begins with an application (e.g. word processor, database, browser, or the like), executing on a server computer system, outputting display information (i.e. text, symbolics, and/or the like), at step 610.

The output information is received by a screen reading engine, at step 615. The screen reading engine outputs the text and symbolics content of the output information to an input/output port, at step 620. The input/output port of the server machine then transmits the text and symbolics content across a network, at step 625.

The transmitted text and symbolics content is received an input/output port of a client computer system, at step 630. The symbolics (i.e. image or the like) are converted by a device proxy to words (i.e. text), by use of the symbolics metadata, such as file name, file description, HTML alt attribute, HTML long description, or the like. The device proxy also breaks the output information into phonemes, diphones, half syllables, syllables, words, and the like, or combinations thereof (e.g. word stem and inflection endings), at step 635.

A phoneme is generally the smallest pieces of speech. Depending upon the language used, there are about 35-50 phonemes in a language. The advantage of converting text, symbolics, and the like to phonemes as opposed to words is that there are fewer phonemes than words, and thus less memory and transmission capacity is required. However, the quality of the transition between phonemes directly relates to the intelligibility of the computer-synthesized speech. To achieve more intelligible computer-synthesized speech; the cut may be done at the center of the phonemes, instead of splitting of the transition. Thus leaving the transitions themselves intact. Such a method is know as diphones. There are about 400 diphones in a language. Furthermore, as those skilled in the art will appreciate there are more half syllables than diphones, more syllable than half syllables, and more words than syllables. Thus, the choice of converting information to phonemes, diphones, half syllable, syllables, or the like will be dependent upon the desired bit rate to be transmitted across the network.

The device proxy then converts the phonemes, diphones, half syllables, syllables, words, combinations thereof, or the like, into a device type file (e.g. audio device file, braille device file, or the like), at step 640. The device proxy then outputs the device type file to a device driver, at step 645. The device driver device type file into a device specific format, at step 650. The device specific format is used to activate an output device such as a speaker, braille reader, or the like.

In an alternative feature of the present embodiment, the device proxy also receives additional characteristics such as rate of speech, accent, and, the like, as inputs from a user. The additional characteristics are utilized by the device proxy to modulate the sound file, or the like.

In another alternative feature of the present embodiment, the server computer system 690 provides a virtual machine operating environment. Thus, the server computer system 690 provides isolation between multiple client computer systems 695 running against the server computer system 690.

Figure 7:
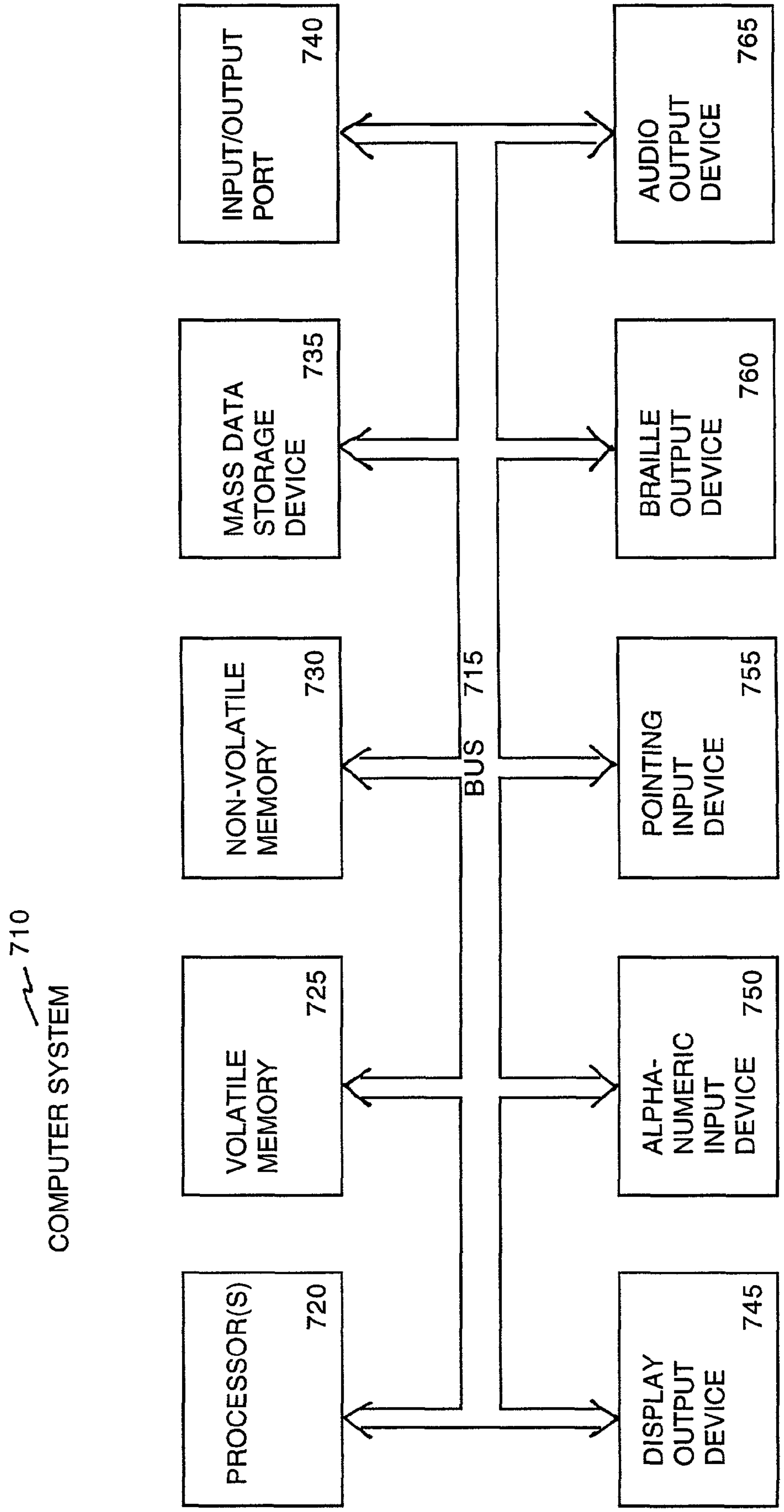
FIG. 7 shows a block diagram of a computer system 10 which provides screen reading assistive technology in accordance with one embodiment of the present invention.

With reference now to FIG. 7, a block diagram of a computer system 10 which provides screen reading assistive technology in accordance with one embodiment of the present invention is shown. As depicted in FIG. 7, the computer system 710 comprises an address/data bus 715 for communicating information and instructions. One or more central processors 720 are coupled with the bus 715 for processing information and instructions. A computer readable volatile memory unit 725 (e.g. random access memory, static RAM, dynamic RAM, and the like) is also coupled with the bus 715 for storing information and instructions for the central processor(s) 720. A computer readable non-volatile memory unit 730 (e.g. read only memory, programmable ROM, flash memory, EPROM, EEPROM, and the like) is also coupled with the bus 715 for storing static information and instructions for the processor(s) 720. The computer system 710 also includes a computer readable mass data storage device 735 such as magnetic or optical disk and disk drive (e.g. hard drive or floppy diskette and the like) coupled with the bus 715 for storing information and instructions. The computer systems 710 also includes on or more input/output ports 740 (e.g. parallel communication port, serial communication port, Universal Serial Bus, Ethernet, Firewire, small computer system interface, infrared communication, Bluetooth wireless communication, broadband, and the like) coupled with the bus 715, for enabling the computer system 710 to interface with other electronic devices and computer systems across a network.

Optionally, the computer system 710 can include, one or more, and any combination thereof: a display device (e.g. video monitor and the like) 745 coupled to the bus 715 for displaying information to a computer user: an alphanumeric 750 device (e.g. keyboard), including alphanumeric and function keys, coupled to the bus 715 for inputting information and commands from the computer user; a pointing device (e.g. mouse) 755 coupled to the bus 715 for communicating user input information and command from the computer user; a braille device 760 coupled to the bus 715 for outputting information to the computer user; and an audio device (e.g. speakers) 765 coupled to the bus 715 for outputting information to the computer user.

The computer system 710 provides the execution platform for implementing certain software-based functionality of the present invention. As described above, certain processes and steps of the present invention are realized, in one implementation, as a series of instructions (e.g. software program) that resides within computer readable memory units 725, 730, 735 of the computer system 710, and are executed by the processor(s) 720 of the computer system. When executed, the instructions cause the computer system 710 to implement the functionality and/or processes of the present invention as described above. In general, the computer system 710 shows the basic components used to implement server machines and client machines.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A server based screen reading method, comprising:

receiving display information from an application operating on said server;

parsing said display information such that text and symbolics to be displayed are detected by said server;

extracting said text and symbolics from the display information by said server;

converting the text and symbolics into a first performant format comprising a representation of phonemes in the text and symbolics, the first performant format being selected based on a first bit rate of transmission across a network to a first client machine;

converting the text and symbolics into a second performant format comprising a representation of diphones in the text and symbolics, the second performant format being selected based on a second bit rate of transmission across the network to a second client machine;

transmitting the text and symbolics in the first performant format from said server on said network to the first client machine, the first client machine being configured to convert the text and symbolics in the first performant format to a first device specific format for rendering on the first client machine; and transmitting the text and symbolics in the second performant format from said server on said network to the second client machine, the second client machine being configured to convert the text and symbolics in the second performant format to a second device specific format for rendering on the second machine, wherein the first device specific format is different from the second device specific format, wherein the text and symbolics in the first performant format requires less memory and transmission capacity comparing to the text and symbolics in the second performant format.

2. The screen reading method according to claim 1, wherein the second performant format is further selected based upon a rate of speech characteristic.

3. The screen reading method according to claim 1, wherein the second performant format is further selected based upon an accent characteristic.

4. The screen reading method according to claim 1, further comprising:

converting the symbolics into text using symbolic metadata.

5. The screen reading method according to claim 4, wherein the metadata is selected from the group consisting of file name, file description, alt attribute, or long description.

6. A computer-readable memory having stored therein one or more sequences of instructions which when executed by a computer system causes the computer system to implement a server based screen reading method, comprising:

receiving display information from an application operating on said server;

parsing said display information such that symbolics and text content of the display information are detected by said server;

extracting said text and symbolics from the display information by said server;

converting the text and symbolics into a first performant format comprising a representation of phonemes in the text and symbolics, the first performant format being selected based on a first bit rate of transmission across a network to a first client machine;

converting the text and symbolics into a second performant format comprising a representation of diphones in the text and symbolics, the second performant format being selected based on a second bit rate of transmission across the network to a second client machine;

transmitting the text and symbolics in the first performant format from said server onto said network to the first client machine, the first client machine being configured to convert the text and symbolics in the first performant format to a first device specific format for rendering on the first client machine; and transmitting the text and symbolics in the second performant format from said server onto said network to the second client machine, the second client machine being configured to convert the text and symbolics in the second performant format to a second device specific format for rendering on the second client machine, wherein the first device specific format is different from the second device specific format, wherein the text and symbolics in the first performant format requires less memory and transmission capacity comparing to the text and symbolics in the second performant format.

7. The computer-readable memory according to claim 6, further comprising:

converting the symbolics into text using symbolic metadata.

8. A system comprising:

a processor; and a memory having stored therein a sequence of instructions which, when executed by the processor, cause the processor to implement screen reading by:

receiving display information from an application;

parsing said display information such that text and symbolics to be displayed are detected;

extracting said text and symbolics from the display information;

converting the text and symbolics into a first performant format comprising a representation of phonemes in the text and symbolics, the first performant format being selected based on a first bit rate of transmission across a network to a first client machine;

converting the text and symbolics into a second performant format comprising a representation of diphones in the text and symbolics, the second performant format being selected based on a second bit rate of transmission across the network to a second client machine;

transmitting the text and symbolics in the first performant format on said network to the first client machine, the first client machine being configured to convert the text and symbolics in the first performant format to a first device specific format for rendering on the first client machine; and transmitting the text and symbolics in the second performant format on said network to the second client machine, the second client machine being configured to convert the text and symbolics in the second performant format to a second device specific format for rendering on the second machine, wherein the first device specific format is different from the second device specific format, wherein the text and symbolics in the first performant format requires less memory and transmission capacity comparing to the text and symbolics in the second performant format.

9. The system of claim 8, wherein the second performant format is further selected based upon a rate of speech characteristic.

10. The system of claim 8, wherein the second performant format is further selected based upon an accent characteristic.

11. The system of claim 8, further comprising:

converting the symbolics into text using symbolic metadata.

12. The system of claim 11, wherein the metadata is selected from the group consisting of file name, file description, alt attribute, or long description.

* * * * *

UNITED STATES PATENT AND TRADEMARK OFFICE

CERTIFICATE OF CORRECTION

PATENT NO. : 8,073,930 B2
APPLICATION NO. : 10/173215
DATED : December 6, 2011
INVENTOR(S) : Yee It is certified that error appears in the above-identified patent and that said Letters Patent is hereby corrected as shown below:

In column 3, line 29, delete “know” and insert -- known --, therefor.

In column 4, line 24, delete “know” and insert -- known --, therefor.

In column 5, line 15, delete “know” and insert -- known --, therefor.

In column 6, line 6, delete “know” and insert -- known --, therefor.

In column 7, line 7, delete “know” and insert -- known --, therefor.

In column 7, line 53, delete “on” and insert -- one --, therefor.

Signed and Sealed this
Sixth Day of March, 2012

David J. Kappos
*Director of the United States Patent and Trademark Office*